United States Patent [19]
Wickham

[11] Patent Number: 5,898,804
[45] Date of Patent: Apr. 27, 1999

[54] PRECISION WAVELENGTH CONTROL FOR AUTOMATED FIBER OPTIC BRAGG GRATING WRITING

[75] Inventor: Michael G. Wickham, Rancho Palos Verdes, Calif.

[73] Assignee: TRW Inc., Redondo Beach, Calif.

[21] Appl. No.: 08/868,827

[22] Filed: Jun. 9, 1997

[51] Int. Cl.⁶ ........................................ G02B 6/26
[52] U.S. Cl. ............................... 385/37; 385/34
[58] Field of Search ................ 385/37, 31, 147, 385/47, 39, 33, 34; 359/565, 566, 569; 430/290, 321

[56] References Cited

U.S. PATENT DOCUMENTS 5,377,288  12/1994  Kashyap et al. ..................... 385/37
5,671,308   9/1997  Inoue et al. ......................... 385/37
5,745,617   4/1998  Starodubov et al. ................ 385/37

*Primary Examiner*—Hung N. Ngo
*Attorney, Agent, or Firm*—Michael S. Yatsko

[57] ABSTRACT

The present invention provides a computer controlled apparatus and method for producing high quality fiber optic Bragg gratings. According to the invention, the apparatus (10) preferably includes a laser (12) for generating an ultraviolet beam (18), a rotatable scrapper mirror (32) disposed downstream of the laser (12) for receiving the beam (18) and an optical fiber (48) disposed adjacent an edge (84) of the mirror (32) for receiving a high fringe frequency interferrogram (86) formed by the mirror (32). The mirror (32) is coupled to a rotation stage (14) for rotating the mirror (32) about a pre-selected pivot point (36) relative to the angle of incidence of the beam (18) to vary the Bragg wavelength at the fiber core.

20 Claims, 3 Drawing Sheets

PRECISION WAVELENGTH CONTROL FOR AUTOMATED FIBER OPTIC BRAGG GRATING WRITING

BACKGROUND OF THE INVENTION

1. Technical Field

The present invention generally relates to Bragg gratings and, more particularly, to an apparatus and method for producing high quality fiber optic Bragg gratings with precise control of the Bragg center wavelength.

2. Discussion

Most fiber optic Bragg gratings are manufactured by exposing the core of a fiber to an intense, spatially modulated ultra violet (UV) beam of radiation. The UV light induces an increase in the index of refraction of the core material in the fiber optic. Thereafter, light launched down the core of the fiber is reflected only if the spatial modulation period ($\Lambda$) and the wavelength of the light ($\lambda$) satisfy the Bragg condition, $\lambda_B = 2n\Lambda$, where n is the mean index of refraction in the fiber core.

According to the prior art, precise positioning of the reflection wavelength center in fiber optic Bragg gratings requires tedious re-alignment of the optics. The production of holographic fringe patterns having appropriate fringe spacing requires precise positioning of the beam combining optics such as the prism and cylindrical lens in prism techniques and the beam splitter, combining mirrors and focusing lenses in open holographic techniques. This makes the production of fiber optic Bragg gratings time consuming and commercially impractical on a large scale basis. As such, there is a need in the art to provide an apparatus and method for routinely producing fiber optic Bragg gratings with precise control of the Bragg center wavelength.

SUMMARY OF THE INVENTION

The above and other objects are provided by a computer controlled apparatus and method for producing high quality fiber optic Bragg gratings. Preferably, the apparatus includes a laser for generating an ultraviolet beam, a rotatable scrapper mirror disposed downstream of the laser for receiving the beam and an optical fiber disposed perpendicular to an edge of the scrapper mirror for receiving a high fringe frequency interferrogram formed by the scrapper mirror. The mirror is coupled to a rotation stage for rotating the mirror about a pre-selected pivot point relative to the angle of incidence of the beam to vary the Bragg wavelength at the fiber core.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
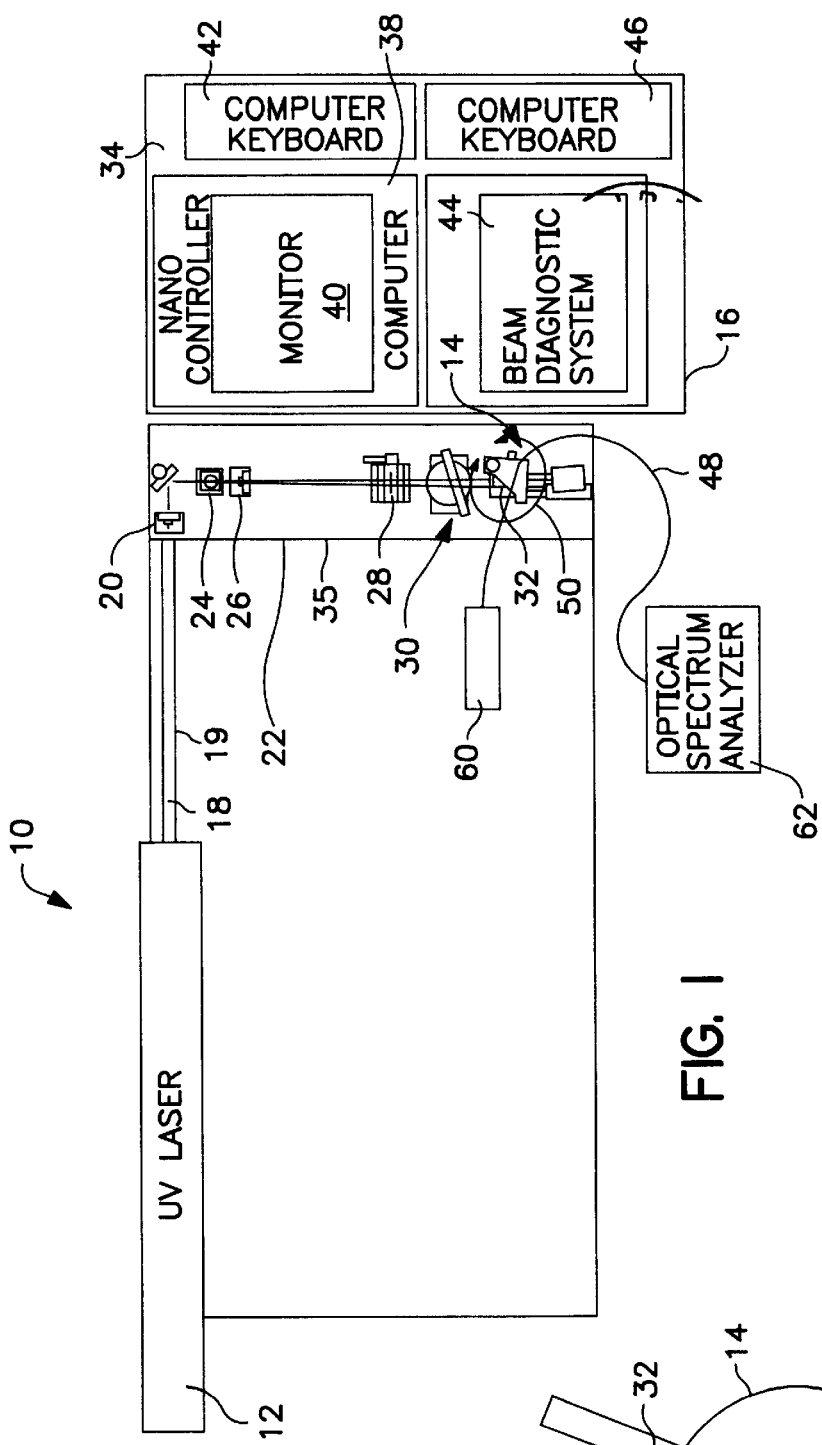
FIG. 1 is a schematic top view of an apparatus for producing fiber optic Bragg gratings with precise control of the Bragg center wavelength in accordance with the present invention.

Turning now to the drawings, FIG. 1 illustrates an apparatus for producing fiber optic Bragg gratings in accordance with the present invention generally at 10. The apparatus 10 generally includes a laser 12, rotation stage 14, and a controller 16.

The laser 12 is preferably a commercially available continuous wave (CW) laser suitable for generating an ultraviolet beam 18. Even more preferably, the laser 12 is an Argon ion laser including a Beta-Barium Borate (BBO) crystal within the laser cavity providing frequency doubled output. For instance, the laser 12 may produce a 100 mW CW beam 18 having a 244 nm wavelength with long coherence length and high beam quality. A tube 19 is used to enclose the beam 18 to prevent open air current from causing wave front distortion.

A half waveplate 20 optically communicates with the laser 12 for rotating the polarization of the beam 18 by 90°. Rotating the polarity of the beam 18 is necessary to form the correct high frequency fringe pattern described below. A galilean telescope 22 is disposed downstream of the waveplate 20 for receiving the beam 18.

The galilean telescope 22 includes a negative lens 24 for beam expansion, an aperture 26 to isolate the central beam from the laser 12 and a positive lens 28 to collimate the beam to the desired diameter. Preferably, a 1.6 cm diameter beam is used herein. A cylindrical lens 30 is disposed in light receiving relation to the galilean telescope 22 for forming a line focus from the beam 18. A cylindrical lens including a 15 cm focal length has been found particularly well suited for this purpose.

A scrapper mirror 32 is coupled to the rotation stage 14 such that it receives the line focus from the cylindrical lens 30. Preferably, the scrapper mirror is a 3 inch-type mirror having a 100% reflectivity coating thereon optimized for polarization in the S direction. The rotation stage 14 communicates with a nano-controller 34 of the controller 16 for precisely rotating the mirror 32 relative to the incident angle of the beam 18. By rotating the mirror 32, the Bragg wavelength may be varied. A plastic enclosure 35 houses the optical train for minimizing wave front distortion.

Figure 2:
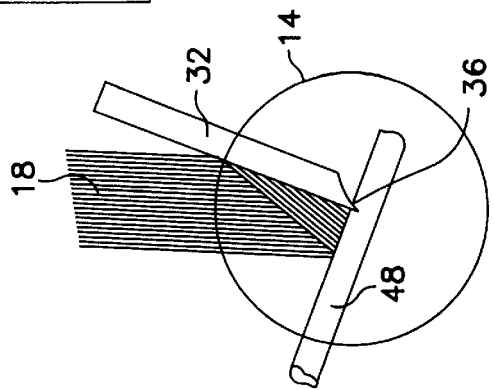
FIG. 2 is a more detailed view of the scrapper mirror and rotation stage of FIG. 1 taken along line 2—2.

Referring momentarily to FIG. 2, a pivot point 36 about which the mirror 32 rotates ensures proper alignment of the line focus with the fiber core when the mirror 32 is rotated to change the grating spacing. As described in greater detail below, automated manufacturing of fiber optic Bragg gratings is enhanced by appropriately selecting the pivot point 36. Through proper selection, the pivot point 36 alleviates the need for translating the mirror 32 when changing to a new Bragg wavelength.

Referring again to FIG. 1, the nano-controller 34 includes a computer or central processing unit (CPU) 38, monitor 40, and keyboard 42. The CPU 38 also communicates with a beam diagnostic system 44 including a dedicated keyboard 46. As described in greater detail below, the nano-controller 34 supplies the drive signal for adjusting the angle of the mirror 32. This adjusting is controlled by the CPU 38.

Figure 3A:
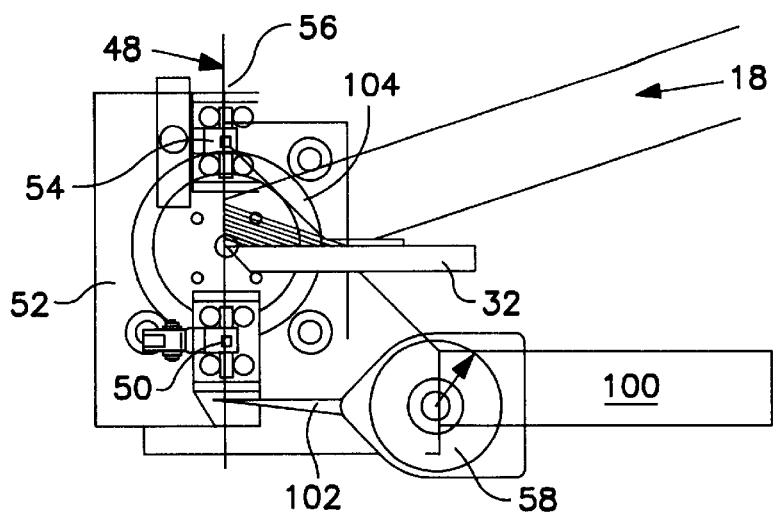
FIGS. 3a–3c are schematic illustrations of the fiber optic mount and rotation stage of FIG. 1.
Figure 3C:
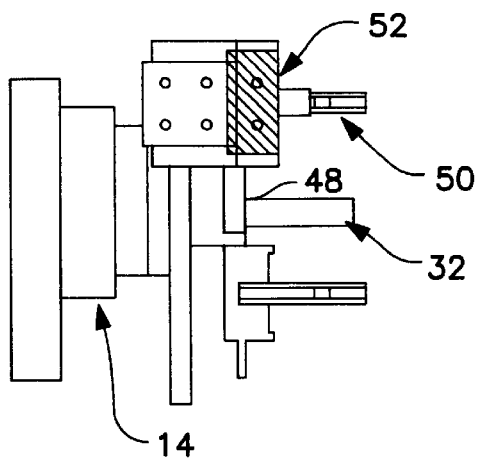
Figure 3B:
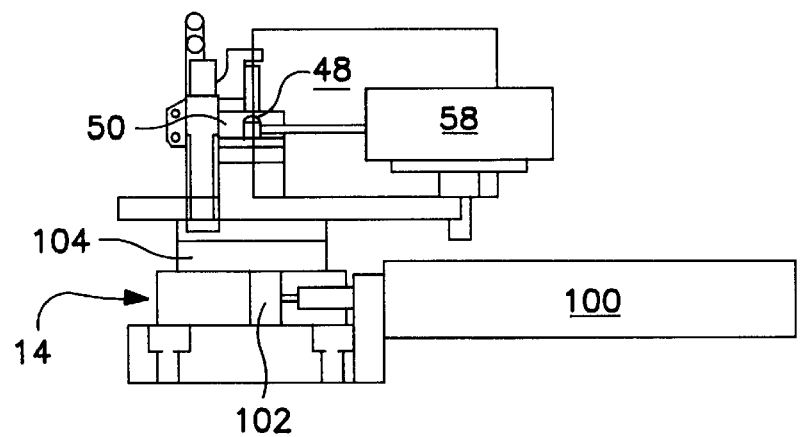

An optical fiber 48 is secured adjacent the mirror 32 by a fiber mount 50. As best seen in FIGS. 3a–3c, the fiber 48 is held under tension on a three axis translation stage 52 which preferably has one micron adjustment resolution. This level of adjustment is preferable since the core diameter of the fiber 48 may be as small as 2 to 5 microns. A final translation stage 54 moves one end 56 of the fiber 48 up and down to assure that the line foci from the two paths of the incident beam (one direct and one reflected from the mirror 32) coincide with the fiber core. Final alignment is provided by adjusting the single slit diffraction patterns created by the two line foci diffracting off the fiber core.

The tension applied to the fiber 48 is set by monitoring the value displayed on a gauge 58 mounted to the fiber mount 50. A shift in wavelength is realized for the specific tension applied to the fiber 48. This known amount is taken into account when making the wavelength positioning setting.

Referring now also to FIG. 1, the nano-controller 34 supplies the drive signal to the nano-drive 100 which moves the moment arm 102 of the rotation drive 104 to adjust the angle of the mirror 32. The nano-drive 100 is controlled by the CPU 38 which steps the nano-drive 100 to provide micro-radian angular intervals. The specific angle of the mirror 32 is to set to the angle required for the Bragg wavelength desired as described below.

As seen in FIG. 1, the fiber optic 48 extends between a light emitting diode (LED) 60 and an optical spectrum analyzer 62. In this way, radiation received by the fiber optic 48 via the mirror 32 may be observed at the LED 60. Also, the transmission spectrum may be monitored on the analyzer 62 while the grating is being formed to verify the wavelength and reflectivity of the Bragg grating. As such, any desired reflectivity can be achieved.

Figure 4:
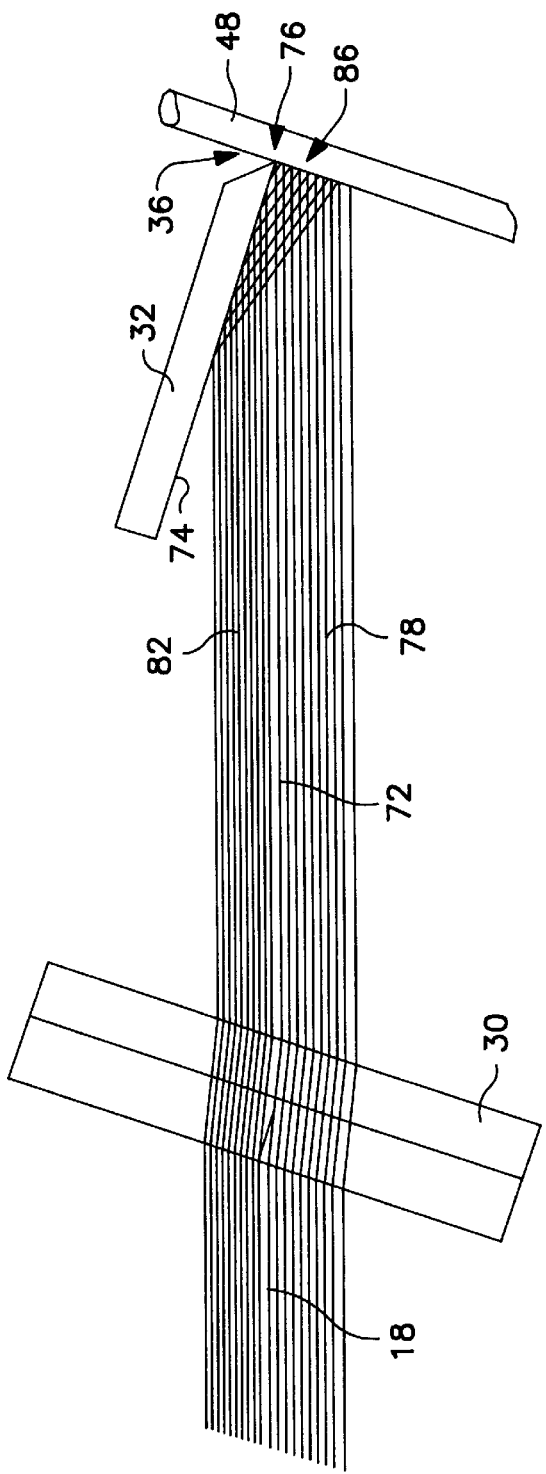
FIG. 4 is a schematic illustration of several ray paths of the incident UV beam overlapping to form the high frequency interferrogram.

Turning now to FIG. 4, the mirror 32 is illustrated in a first position appropriate for writing Bragg gratings at a preselected wavelength. For example, this wavelength may be of particular interest for the communications industry. However, it should be noted that the present invention is also suitable for writing Bragg gratings within other wavelength ranges. Additionally, it should be understood that the first, second or preselected wavelengths described within this specification represent regions of wavelengths and therefore are not limited to any specific wavelength stated. As mentioned above, the mirror 32 may be moved to new Bragg wavelength positions by rotating the mirror 32 about a preselected pivot point 36. However, if the pivot point 36 is incorrectly selected, the mirror 32 must also be translated to maintain optimum alignment.

As shown in FIG. 4, the mirror 32 is in the proper position for writing a Bragg grating at a known wavelength. As can be seen, the UV writing beam center axis 72 is incident upon the face 74 of the mirror 32. The specific relation between the incident angle θ of the UV beam 18 to the face 74 of the mirror 32 is given by the following equation:

$$\lambda B := n0 \frac{\lambda uv}{\sin\theta_L}$$

where:
n0=the index of refraction of the fiber core at the Bragg wavelength;
θ:=the incident angle;
λuv=the wavelength of the UV light; and
λB=the Bragg wavelength.

In the illustrated embodiment, the left portion 78 of the beam 18 reflects off the face 74 of the mirror 32 while the right portion 82 of the beam 18 travels directly to the fiber 48. At the fiber 48, the left portion 78 of the beam 18 overlaps the right portion 82 of the beam 18 creating the high-fringe frequency interferrogram 86 required for writing the Bragg grating.

It can be appreciated that when the center axis 72 of the beam 18 does not intersect the apex 76 of the mirror 32, the beam overlap is not symmetric. That is, the left portion 78 or right portion 82 of the beam 18 does not have the same spatial extent as the other half 82, 78 of the beam 18. A symmetric overlap is assured by rotating the mirror 32 about the optimum pivot point 36 to change the Bragg wavelength. A translation of the mirror 32 may be required to achieve a symmetric overlap of the left portion 78 and right portion 82 of the UV writing beam 18 if the rotation is performed about an incorrect pivot point 36.

The mirror 32 may be rotated about the pivot point 36 for selective positioning of the mirror 32 to one of a range of known wavelength Bragg writing locations. The axial position along the UV beam 18 is chosen such that the cylindrical focus of the beam 18 contacts the core of the fiber 48 (FIG. 1).

Still referring to FIG. 4, in order to assure proper alignment of the line focus with the fiber 48, it may be necessary to rotate the cylindrical lens 30 relative to the beam 18. To accomplish this, the cylindrical lens 30 is rotated to be parallel to the fiber 48 to cause the line focus to be perpendicular to the fiber 48. This assures properly matched interference at the fiber 48 which produces the high spatial frequency interferrogram 86 at the core of the fiber 48 and forms the spatially modulated UV light necessary for creating the fiber optic Bragg grating.

Thus, the pivot point 36 for the mirror 32 remains valid when changing from one wavelength region to another, for example, 1300 nm to 1500 nm. In the illustrated embodiment, the location of the pivot point 36 is valid for a broad range of incident angles. Accordingly, high quality Bragg gratings may be routinely manufactured with precise control of the Bragg center wavelength. Furthermore, the tedious re-alignment of the apparatus elements as required in prior art systems for writing at different wavelengths is alleviated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An apparatus for writing fiber optic Bragg gratings over a range of Bragg wavelengths, said apparatus comprising:

a laser for generating an ultraviolet beam;

a cylindrical lens disposed downstream of said laser for aligning a line focus of said beam;

a mirror disposed downstream of said cylindrical lens such that a portion of said beam is incident on a face of said mirror;

a rotation stage coupled to said mirror for rotating said mirror about a preselected pivot point relative to an angle of incidence of said beam to vary said Bragg wavelength within said range; and an optical fiber disposed adjacent an edge of said mirror for receiving a high fringe frequency interferrogram formed by said portion of said beam incident on said mirror interfering with another portion of said beam travelling directly from said cylindrical lens to said optical fiber, said high fringe frequency interferrogram writing said Bragg grating thereon.

2. The apparatus of claim 1 wherein said mirror further comprises a scrapper mirror.

3. The apparatus of claim 1 further comprising:

a fiber mount for securing said fiber adjacent said edge of said mirror, said fiber mount including a three axis translation stage for adjusting a position of a core portion of said fiber relative to said line focus.

4. The apparatus of claim 1 further comprising:

a half waveplate interposed between said laser and said cylindrical lens for rotating a polarization of said beam by 90°.

5. The apparatus of claim 1 further comprising:

a galilean telescope interposed between said laser and said cylindrical lens for changing a diameter of said beam to a predetermined size.

6. The apparatus of claim 1 further comprising:

an optical spectrum analyzer coupled to a first end of said optical fiber for monitoring a wavelength and reflectively of a core portion of said fiber while said Bragg grating is being formed.

7. The apparatus of claim 1 further comprising:

a nano-controller operably coupled to said rotation stage for precisely rotating said mirror relative to said beam.

8. The apparatus of claim 1 wherein said pivot point is located at a position about which said mirror may be rotated between a first orientation for writing Bragg gratings at a first wavelength and a second orientation for writing Bragg gratings at a second wavelength.

9. The apparatus of claim 1 wherein said laser further comprises an Argon ion laser including a Beta-Barium Borate crystal for providing frequency doubled output.

10. The apparatus of claim 1 wherein said beam further comprises a 100 mW continuous wave beam at a 244 nm wavelength.

11. The apparatus of claim 1 wherein said mirror further comprises a three inch type scrapper mirror having a 100% reflectivity coating deposited thereon polarized in the S-direction.

12. The apparatus of claim 1 wherein said cylindrical lens further comprises a cylindrical lens having 15 cm focal length.

13. The apparatus of claim 3 wherein said fiber mount further comprises a final translation stage for moving one end of said fiber vertically with respect to said mirror to align said line focus with a core of said fiber.

14. The apparatus of claim 3 wherein said fiber mount further comprises a tensioning member for shifting said Bragg wavelength according to a tension applied to said fiber.

15. The apparatus of claim 5 wherein said galilean telescope further comprises:

a beam spreader for expanding a diameter of said beam; and a collimating lens for maintaining said beam at a preselected diameter.

16. The apparatus of claim 15 wherein said preselected diameter is equal to 1.6 cm.

17. The apparatus of claim 7 wherein said nano-controller further comprises a computer operably coupled to a beam diagnostic system.

18. A method of writing fiber optic Bragg gratings over a range of Bragg wavelengths comprising the steps of:

selecting a laser for generating an ultraviolet beam;

positioning a cylindrical lens downstream of said laser for aligning a line focus of said beam;

positioning a mirror downstream of said cylindrical lens such that a portion of said beam is incident on a face of said mirror;

coupling a rotation stage to said mirror for rotating said mirror about a preselected pivot point relative to an angle of incidence of said beam to vary said Bragg wavelength within said range;

securing an optical fiber adjacent an edge of said mirror for receiving a high fringe frequency interferrogram formed by said portion of said beam incident on said mirror interfering with another portion of said beam travelling directly from said cylindrical lens to said optical fiber, said high fringe frequency interferrogram writing said Bragg grating thereon; and causing said line focus to impinge on a core portion of said fiber.

19. The method of claim 18 further comprising:

providing a fiber mount for securing said fiber adjacent said edge of said mirror, said fiber mount including a three axis translation stage for adjusting a position of said core relative to said line focus.

20. The method of claim 18 wherein said mirror further comprises a scrapper mirror.

* * * * *